(12) United States Patent
Lau et al.

(10) Patent No.: US 6,744,606 B2
(45) Date of Patent: Jun. 1, 2004

(54) DUAL PLANE ACTUATOR

(75) Inventors: Joseph HengTung Lau, Singapore (SG); Terang KongBeng Thia, Singapore (SG); PohLye Lim, Singapore (SG); ChorShan Cheng, Singapore (SG); Andre YewLoon Liem, Singapore (SG); SiewMing Ng, Singapore (SG); Niroot Jierapipatanakul, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 81 days.

(21) Appl. No.: 10/218,240

(22) Filed: Aug. 13, 2002

(65) Prior Publication Data

US 2003/0030941 A1 Feb. 13, 2003

Related U.S. Application Data

(60) Provisional application No. 60/312,023, filed on Aug. 13, 2001.

(51) Int. Cl.$^7$ .................................................. G11B 5/55
(52) U.S. Cl. ..................................................... 360/266
(58) Field of Search ............................. 360/265.8, 266, 360/265.7

(56) References Cited

U.S. PATENT DOCUMENTS

| 5,343,347 | A | * | 8/1994 | Gilovich ................... 360/246.7 |
| 5,452,151 | A | * | 9/1995 | Money et al. ................ 360/75 |
| 5,959,952 | A | | 9/1999 | Wakuda |
| 5,978,178 | A | | 11/1999 | Adley |
| 6,661,615 | B2 | * | 12/2003 | Tsuda ....................... 360/265.7 |

* cited by examiner

Primary Examiner—A. J. Heinz
(74) Attorney, Agent, or Firm—Derek J. Berger

(57) ABSTRACT

A dual plane single-stage actuator is disclosed. The actuator includes a step portion between the coil and head support portions, which increases its stiffness while permitting the coil support portion and head support portion of the actuator to lie in different planes. This allows the actuator to be installed in low-profile drives.

20 Claims, 3 Drawing Sheets

DUAL PLANE ACTUATOR

CROSS REFERENCE TO RELATED APPLICATION

This application claims the benefit of U.S. Provisional Application No. 60/312,023, filed Aug. 13, 2001.

FIELD OF THE INVENTION

This invention relates generally to the field of hard disc drive data storage devices, and more particularly, but not by way of limitation, to disc drive actuators.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM.

Data are recorded to and retrieved from the discs by at least one read/write head assembly, also known as a head or slider, which are controllably moved from track to track by an actuator assembly. Where more than one head are used, an array of heads are typically vertically aligned. The read/write head assemblies typically comprise an electro-magnetic transducer carried on an air bearing slider. This slider acts in a cooperative pneumatic relationship with a thin layer of air dragged along by the spinning discs to fly the head assembly in a closely spaced relationship to the disc surface. In order to maintain the proper flying relationship between the head assemblies and the discs, the head assemblies are attached to and supported by flexures attached to the actuator.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. The actuator is mounted to the pivot shaft by a pivot assembly, which may take the form of precision ball bearing assemblies within a bearing housing. The actuator supports a flat coil which is suspended in the magnetic field of an array of permanent magnets, which are fixedly mounted to the disc drive housing base member.

On the side of the actuator bearing housing opposite to the coil, the actuator assembly typically includes one or more vertically aligned, radially extending actuator head mounting arms, to which the head suspensions mentioned above are mounted. These actuator arms extend between the discs, where they support the head assemblies at their desired positions adjacent the disc surfaces. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator rotates, the heads are moved generally radially across the data tracks of the discs along an arcuate path.

As explained above, the actuator assembly typically includes an actuator body that pivots about a pivot mechanism disposed in a medial portion thereof. The function of the pivot mechanism is crucial in meeting performance requirements associated with the positioning of the actuator assembly. A typical pivot mechanism takes the form of a bearing cartridge having upper and lower bearings with a stationary shaft attached to an inner race and a sleeve attached to an outer race. The sleeve has typically been secured within a bore in the actuator body using a set screw, a C-clip, a tolerance ring or press-fitting, while the stationary shaft typically is attached to both the base deck and the top cover of the disc drive. It has also been contemplated that the bearing cartridge could itself be fixed to the base, while the actuator is attached to the pivot shaft which is free to rotate within the pivot cartridge housing, especially in the case of single stage actuators as will now be explained.

Recently, advances in storage technology have greatly increased the data storage capacity of magnetic storage discs. As a result, a single storage disc is now capable of storing large amounts of data which would have required a stack of several discs in the past. Some drive manufacturers have begun to produce disc drives having fewer discs, and even a single disc, as often a single disc may have storage capacity sufficient for a given application. In addition to the obvious cost advantages gained by using only one disc, one advantage to providing only one disc is that the actuator must carry only one or at most two heads. Such an actuator may have only one arm and therefore have a rotational inertia much smaller than that of conventional actuators with multiple arms. Moreover, an actuator with only one arm may be produced from a single planar sheet of material, supporting a coil at one end and a head suspension at another. This type of actuator may be more easily manufactured than conventional actuators, such as by stamping, and is further advantageous in that it has relatively low inertia, allowing faster seek acceleration and deceleration. On the other hand, a planar element is susceptible to vibration in the first bending mode, in which the member may bend in a direction perpendicular the plane in which it lies, giving it a relatively low resonant frequency, increasing read-write errors while decreasing drive reliability, often culminating in drive failure.

Drives having only one disc and one actuator arm also offer the opportunity to produce low-profile disc drives having a reduced height. In the past, disc drives were typically used for storage of data in personal computers and in storage arrays for storing huge amounts of data in enterprise applications. Presently, however, drives are being contemplated for use in a wide variety of consumer products, such as television set-top video recorders, video game consoles, and hand-held computers. These applications present a new set of challenges to the drive industry, requiring that drives be more quiet and smaller than ever before. In particular, there is a need to produce drives having a height which is decreased relative to that of conventional drives to enable use in hand-held and card-type applications.

As drive housings become smaller, however, space availability in the housing has decreased, especially in the vertical direction. Actuator pivot assemblies occupy vertical space, as do voice coil poles and magnets, and spindle motor and hub designs often limit the height at which a disc can be mounted. Often design requirements dictate the disc, magnets and actuator pivot be arranged such that a planar actuator is not capable of being properly aligned with both the disc and VCM.

What the prior art has been lacking is a planar actuator with increased bandwidth and the ability to fit into increasingly low-profile disc drives.

SUMMARY OF THE INVENTION

The present invention is directed to a dual plane single-stage actuator. The actuator includes a step portion between the coil and head support portions, which increases its stiffness while permitting the coil support portion and head support portion of the actuator to lie in different planes. This allows the actuator to be installed in low-profile drives.

These and other features and benefits will become apparent upon review of the following figures and the accompanying detailed description.

DETAILED DESCRIPTION OF THE INVENTION

Figure 1:
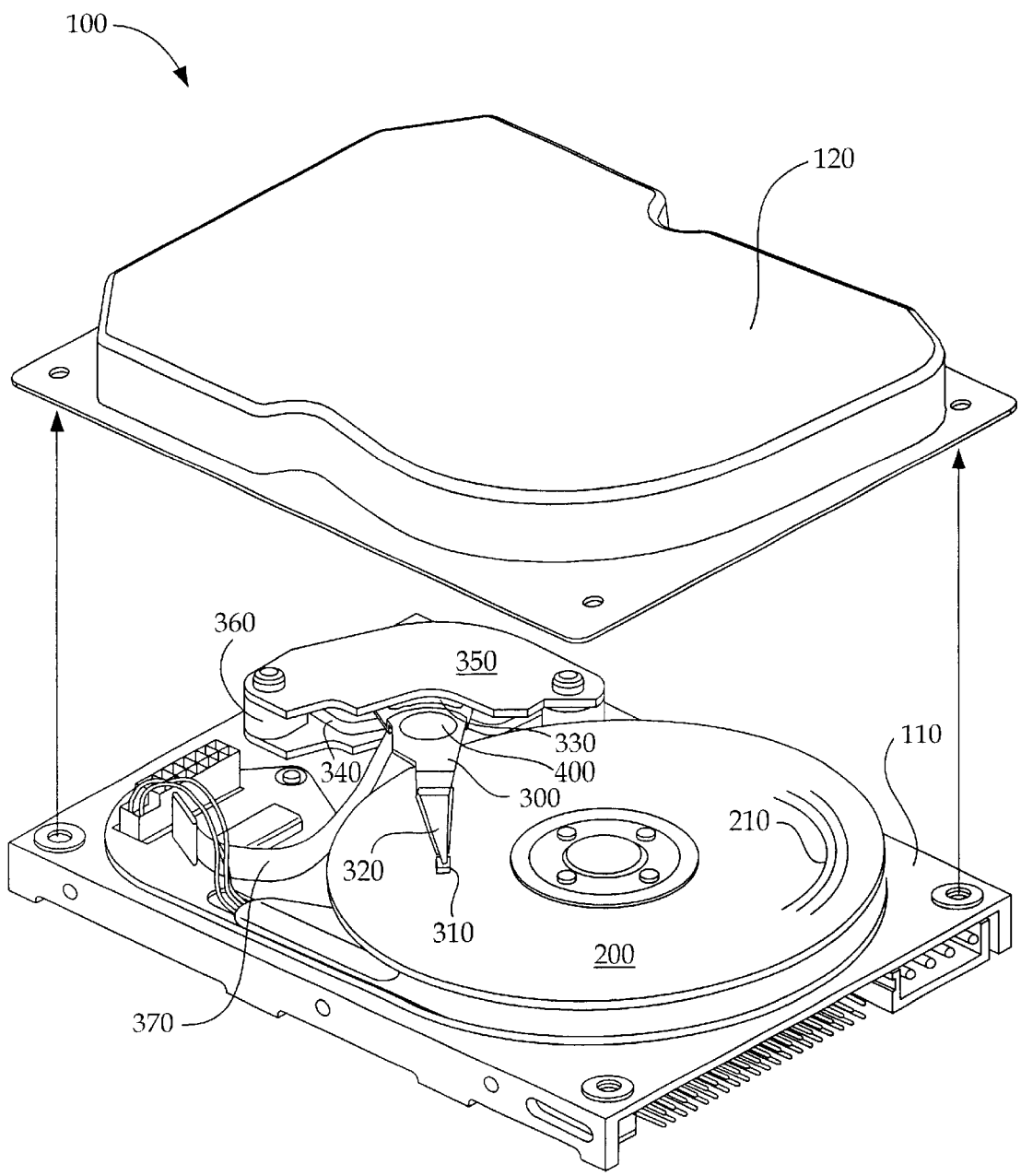
FIG. 1 shows a plan view of a disc drive incorporating one embodiment of the actuator of the present invention.

Turning now to the drawings and specifically to FIG. 1, shown is an exploded view of one example of a disc drive 100 in which the present invention is particularly useful. The disc drive 100 includes a deck 110 to which all other components are directly or indirectly mounted and a top cover 120 which, together with the deck 110, forms a disc drive housing which encloses delicate internal components and isolates these components from external contaminants.

The disc drive 100 includes at least one disc 200 which is mounted for rotation on a spindle motor (not shown). The disc or discs 200 include on their surfaces a plurality of circular, concentric data tracks on which data are recorded one or more vertically aligned head assemblies 310. The head assemblies 310 are supported by flexures 320, which are attached to arms 325 of actuator 300. The actuator 300 is mounted to a bearing assembly 400 about which the actuator 300 rotates.

Power to drive the actuator 300 about the pivot assembly 400 is provided by a voice coil motor (VCM). The VCM includes a coil 330 which is supported by the actuator 300 within the magnetic field of a permanent magnet assembly having spaced upper and lower magnets, the lower of which is illustrated at 340. Electronic circuitry is provided on a printed circuit board (PCB, not shown) mounted to the underside of the deck 110. Control signals to drive the VCM are carried between the PCB and the moving actuator 300 via a flexible printed circuit cable (PCC) 370, which also transmits data signals to and from the heads 330.

Figure 2:
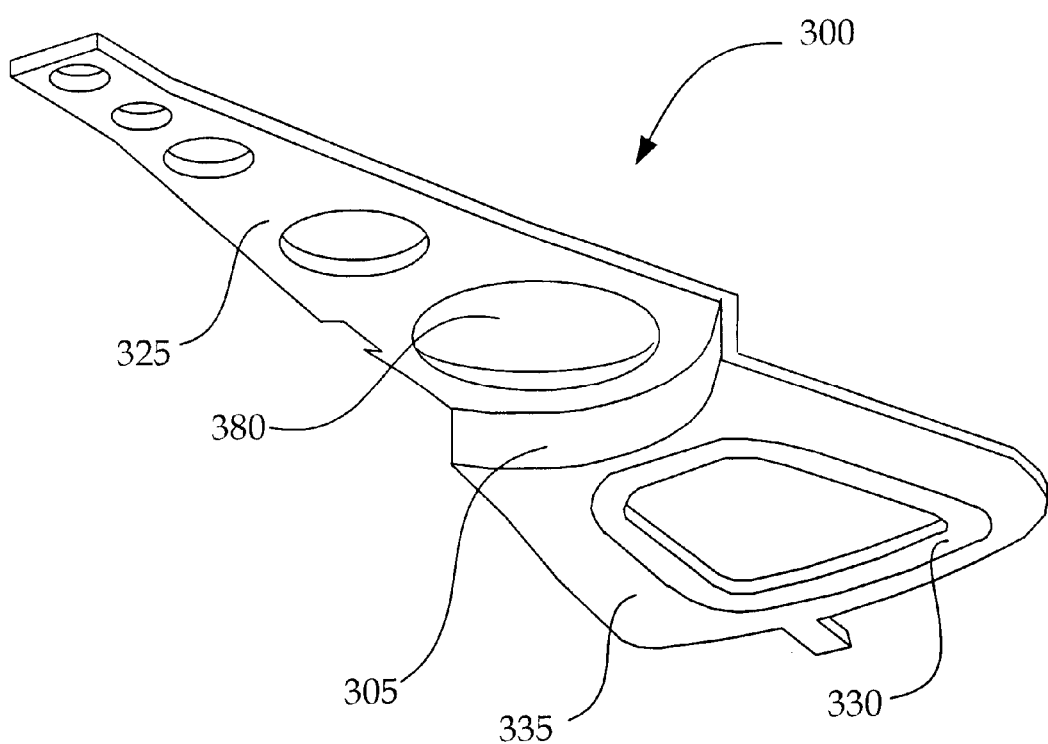
FIG. 2 shows a plan view of a one embodiment of an actuator of the present invention.

FIG. 2 shows a perspective view from beneath one embodiment of an actuator 300 of the present invention. The actuator 300 includes an aperture 380 for mounting to an actuator pivot assembly 400, as will be explained later. The actuator 300 also has a single arm 325 which is configured to support a read/write head 310 by way of a load beam or flexure 320 at its distal end. Also shown is a coil support portion 335 in which the coil 330 is mounted as part of the VCM which effects rotational movement of the actuator 300. The arm 325 and coil support portion 335 are separated by a "step" portion 305 which serves a number of different functions.

One advantage provided by step portion 305 relates to use of space within the drive housing. As drives have become smaller, space requirements within the housing have become more constrained. For example, a conventional spindle motor has a minimum height, such that the surface of a disc mounted upon the spindle motor also has a minimum height at which it may be mounted within the housing. similarly, voice coil magnets 340 and pole pieces 350 have thicknesses and must be spaced within the drive 100. Where overall drive height is to be minimized, it is often difficult to vertically align the areas to be occupied by the coil support portion 335 of the actuator 300 and the actuator arm 325. This is especially true when spindle motors and VCM assemblies are imported into a new drive design in an effort to reduce redesign costs.

Figure 3:
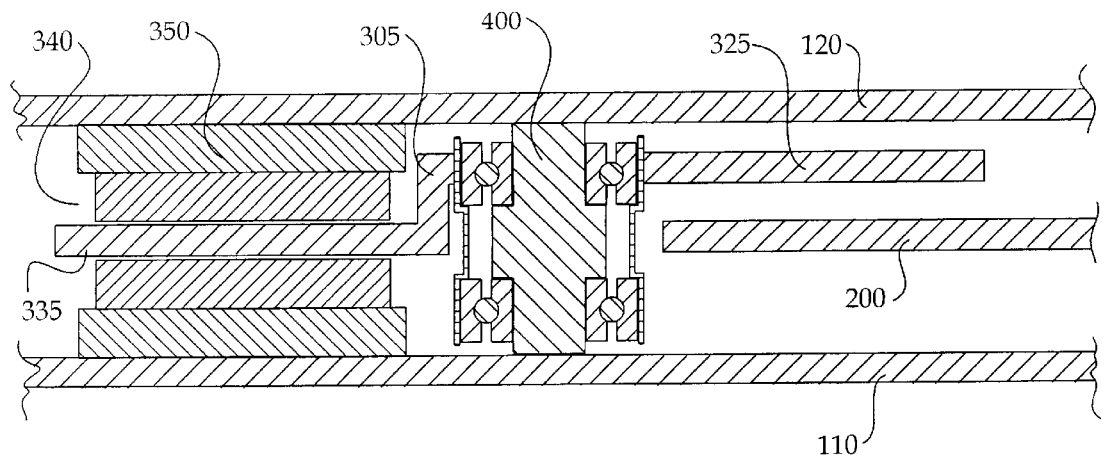
FIG. 3 shows a cross-sectional partial view of a disc drive incorporating one embodiment of the actuator of the present invention.

FIG. 3 shows a cross-sectional view of the actuator 300 of FIG. 2 mounted within a drive in which the spaces allocated for the coil support 335 and actuator arm 325 are not horizontally aligned. It can be clearly seen that in this instance, the voice coil magnets 340 and pole pieces 350 chosen restrict the vertical position of the coil 330. Moreover, it would be impossible to lower the disc 200 enough to allow the arm 320 of an actuator 300 lying in a single plane to be positioned above the disc 200. In this embodiment of the present invention, however, actuator 300 in fact lies in two planes. The coil support portion 335 lies at a first elevation, allowing the coil to be positioned between voice coil magnets 340, while actuator arm 325 is positioned at a higher level, allowing it to pass above the upper surface of disc 200.

Another advantage provided by step feature 305 is higher stiffness. A simple planar actuator is relatively stiff in a horizontal direction, meaning it has high resonant frequencies in the system mode. However, a planar actuator is susceptible to out of plane vibrations, leading to a relative low resonant frequency in the bending modes. This is especially true where pivot mounting opening 380 is large enough to accommodate an entire pivot cartridge as in embodiment of FIG. 2. It can be seen in FIG. 2 that step portion 305 may be configured as a curved vertical surface, and may even partially surround the aperture 380 serving to stiffen the actuator 300 in the vertical direction.

The dual-plane actuator 300 may be formed by any of a number of methods and materials. It has been found that stamping the actuator 300 out of a metallic sheet material is a particularly effective method. However, it is also contemplated that the actuator 300 could be injection molded of a plastic material, or formed of a number of parts without departing from the spirit of the invention.

It should also be understood that FIGS. 2 and 3 represent only one embodiment of a multi-plane actuator. For example, the coil support portion 335 could be higher than the actuator arm 325. As another example, the step portion 305 could be located closer on the other side of aperture 380, nearer the actuator arm 325 than the coil support 335.

Figure 4:
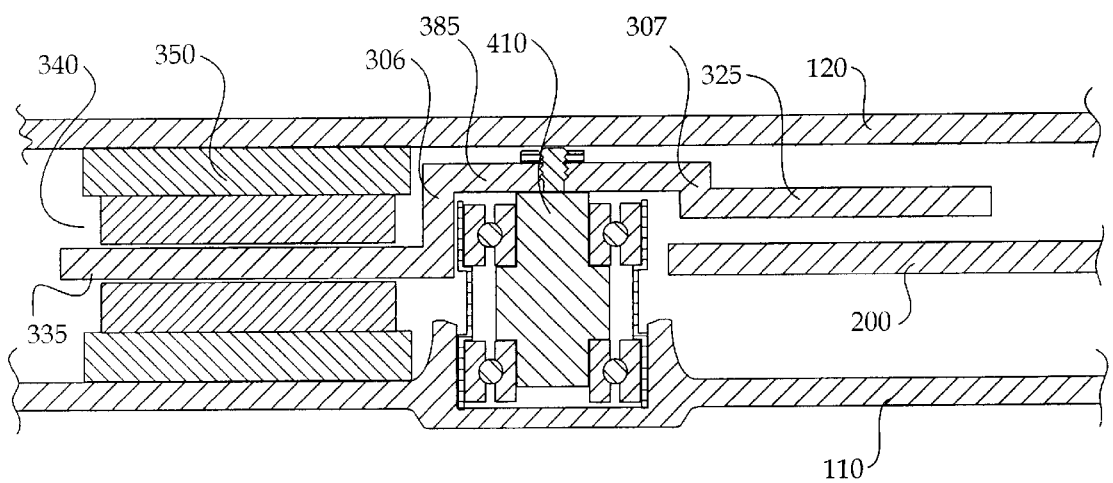
FIG. 4 shows a cross-sectional partial view of a disc drive incorporating another embodiment of an actuator of the present invention.

It is even contemplated that the actuator 300 could lie in more than two planes. FIG. 4 illustrates one embodiment of a disc drive in which the actuator 300 is mounted atop a pivot cartridge 410 via a threaded element and a small aperture 385 in the actuator 300. In this embodiment, the actuator 300 is provided with two step portions 306,307 which allow the coil support portion 335, the actuator arm 325 and the actuator pivot portion 385 to be located at three different elevations. In addition, the addition of a second step portion would further stiffen the actuator 300 in the area about the pivot portion 385 near the actuator arm 325.

Alternatively stated, a first contemplated embodiment of the invention takes the form of an actuator (such as 300) for use in a disc drive (such as 100), including a coil support portion (such as 335) configured to support a coil (such as 330) and generally defining a first plane, and a single arm portion (such as 325) configured to support a head suspension assembly (such as 320) and generally defining a second plane, the first plane being distinct from the first plane. The first plane may be parallel to the second plane. The coil support portion (such as 335) and the arm portion (such as 325) may be integrally formed. The actuator (such as 300) may also include a step portion (such as 305) lying between the coil support portion (such as 335) and the arm portion (such as 325). The step portion (such as 305) may be curved. Optionally, the step portion (such as 305) may be connected to the coil support portion (such as 335). The coil support portion (such as 335), the arm portion (such as 325) and the step portion (such as 305) may be integrally formed. Optionally, the actuator (such as 300) may be formed by stamping. The first plane may be horizontal and the step portion may extend vertically.

Alternately stated, a second contemplated embodiment of the invention takes the form of a disc drive (such as 100) including a base (such as 110) and an actuator (such as 300) rotatably mounted to the base (such as 110). The actuator (such as 300) includes a coil support portion (such as 335) positioned at a first height above the base (such as 110) and a single arm support portion (such as 325) positioned at a second height above the base (such as 110). The second height is different than the first height. The coil support portion (such as 335) may be configured to support a coil (such as 330). The arm portion (such as 325) may be configured to support a head suspension assembly (such as 320). The coil support portion (such as 335) may be generally planar. The arm portion (such as 325) my be generally planar. Optionally, the actuator (such as 300) may be formed by stamping.

In short, it is apparent that the present invention is particularly suited to provide the benefits described above. While particular embodiments of the invention have been described herein, modifications to the embodiments which fall within the envisioned scope of the invention may suggest themselves to one of skill in the art who reads this disclosure.

What is claimed is:

1. An actuator for use in a disc drive, comprising:
   a coil support portion configured to support a coil and generally defining a first plane; and
   a single arm portion configured to support a head suspension assembly and generally defining a second plane, the first plane being distinct from the first plane.

2. The actuator of claim 1, in which the first plane is parallel to the second plane.

3. The actuator of claim 1, in which the coil support portion and the arm portion are integrally formed.

4. The actuator of claim 1, further comprising:
   a step portion, the step portion lying between the coil support portion and the arm portion.

5. The actuator of claim 4, in which the step portion is curved.

6. The actuator of claim 4, in which the step portion is connected to the coil support portion.

7. The actuator of claim 4, in which the coil support portion, the arm portion and the step portion are integrally formed.

8. The actuator of claim 1, in which the actuator is formed by stamping.

9. The actuator of claim 1, in which the first plane is horizontal and the step portion is extends vertically.

10. A disc drive comprising the actuator of claim 1.

11. A disc drive, comprising:
    a base; and
    an actuator rotatably mounted to the base, the actuator comprising:
       a coil support portion positioned at a first height above the base; and
       a single arm support portion positioned at a second height above the base, the second height being different than the first height.

12. The disc drive of claim 11, in which the coil support portion is configured to support a coil.

13. The disc drive of claim 11, in which the arm portion is configured to support a head suspension assembly.

14. The disc drive of claim 11, in which the coil support portion is generally planar.

15. The disc drive of claim 11, in which the arm portion is generally planar.

16. The disc drive of claim 11, in which the actuator is formed by stamping.

17. A disc drive comprising:
    a base; and
    an actuator, the actuator comprising:
       a coil support portion configured to support a coil;
       a single arm portion configured to support a head suspension assembly; and
       means for positioning the coil support portion and the arm portion at different distances from the base.

18. The disc drive of claim 17, in which the positioning means comprises a curved element.

19. The disc drive of claim 17, in which the positioning means comprises a portion integrally formed with the coil support portion.

20. The disc drive of claim 17, in which the actuator is rotatable about an axis, and in which the positioning means extends parallel to the axis.

* * * * *